UNITED STATES PATENT OFFICE.

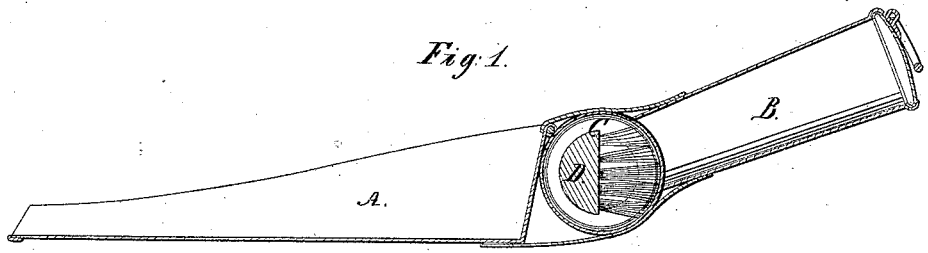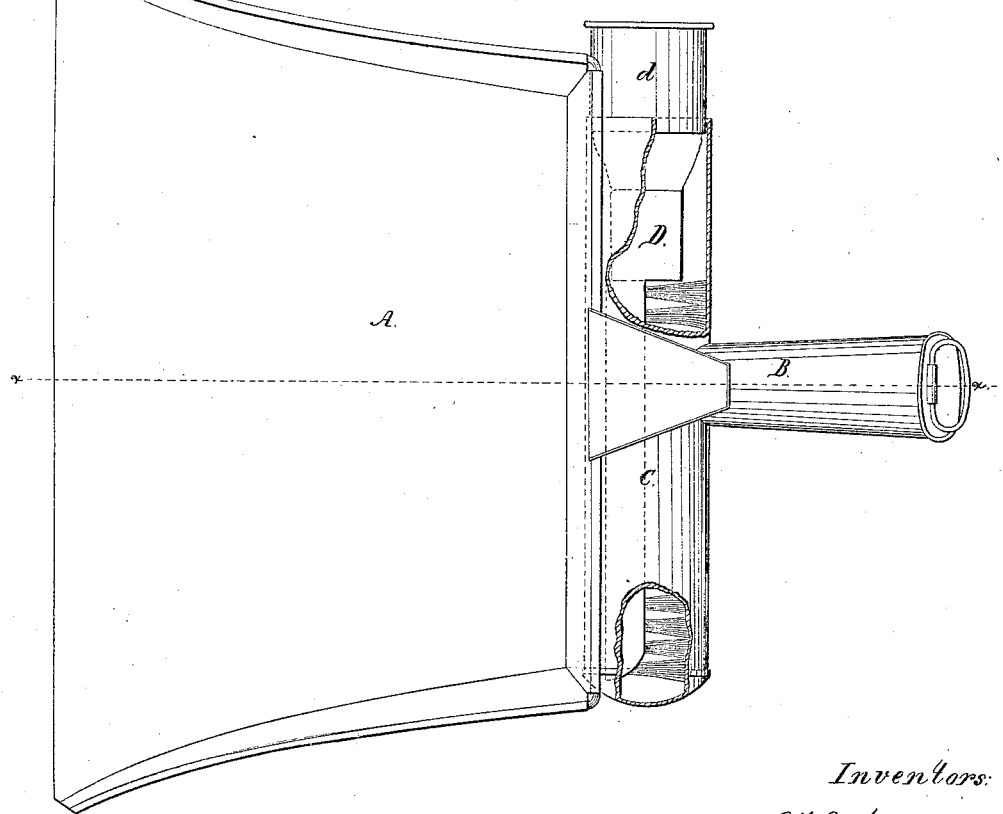

CHAS. H. PARKER AND GRIDLEY BURNHAM, OF WALTHAM, MASS.

DUST PAN AND BRUSH.

Specification forming part of Letters Patent No. 50,270, dated October 3, 1865.

*To all whom it may concern:*

Be it known that we, CHARLES H. PARKER and GRIDLEY BURNHAM, of Waltham, in the county of Middlesex and State of Massachusetts, have invented a Combined Dust-Pan and Dust-Brush; and we do hereby declare that the following is a full, clear, and exact description thereof, which will enable others skilled in the art to make and use the same, reference being had to the accompanying drawings, forming part of this specification, in which—

Figure 1 is a longitudinal central section taken on the line $x\ x$, Fig. 2. Fig. 2 is a plan or top view of our invention.

This invention relates to a different manner of combining a dust-pan and dust-brush to that patented to us on the 4th day of July, 1865, which consisted in an enlargement of the handle of the dust-pan to make it capable of receiving within it a dust-brush.

The present invention consists in attaching to the back, sides, top, or bottom of a dust-pan a suitable receptacle for holding a dust-brush intended for use in connection with the dust-pan.

To enable others to fully understand our invention, we will proceed to describe it.

A represents the dust-pan, and B the handle thereof, both constructed in the usual or any suitable way. C represents the receptacle for holding the brush, which in the present instance is a cylindrical case attached to the pan along the back thereof, and the handle B is soldered or secured directly to this case, and has strengthening-strips $a\ a$ connecting it directly to the pan, as shown clearly in Fig. 1; but it is obvious that the handle could be otherwise attached if found desirable.

D is the brush, which is shown in both figures as being inserted in the receptacle C. In the present instance it is made of bristles, and has a handle, $d$, extending out sufficiently far beyond the side strip of the pan to enable it to be readily taken hold of.

Other styles of brushes may be used; but in instances where the common whisp-brush is used it will be necessary to use a ring or some such contrivance to keep the ends of the whisks together, so as to permit the insertion of the brush into the receptacle or case.

We find this present invention—namely, attaching to the pan a receptacle for receiving the brush—superior in many respects to our former invention previously alluded to, inasmuch as it produces a neater-appearing article and one more easily used, because the handle in the previous case was rather too large to be conveniently taken hold of; but in this instance neither the dust-pan nor its handle need be changed to admit its adaptation.

What we claim as new, and desire to secure by Letters Patent, is—

Attaching to the back, sides, top, or bottom of a dust-pan a suitable receptacle for holding a dust-brush intended for use in connection with a dust-pan, substantially as herein shown and described.

CHARLES H. PARKER.
GRIDLEY BURNHAM.

Witnesses:
FRANK W. BIGELOW,
CHAS. H. STICKNEY.